(12) United States Patent
Chen et al.

(10) Patent No.: US 9,769,347 B2
(45) Date of Patent: Sep. 19, 2017

(54) IMAGE CAPTURING METHOD (71) Applicant: TECO IMAGE SYSTEMS CO., LTD., Taipei (TW)

(72) Inventors: Yang-Ting Chen, Taipei (TW); Ko-Meng Chen, Taipei (TW); Kurt Eugene Spears, Fort Collins, CO (US)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 0 days.

(21) Appl. No.: 14/968,543

(22) Filed: Dec. 14, 2015

(65) Prior Publication Data

US 2017/0126922 A1 May 4, 2017

(30) Foreign Application Priority Data

Oct. 30, 2015 (TW) .............................. 104135691 A (51) Int. Cl.
H04N 1/024 (2006.01)
G06K 9/32 (2006.01)
H04N 1/04 (2006.01)
H04N 1/00 (2006.01)

(52) U.S. Cl.
CPC ........... *H04N 1/04* (2013.01); *H04N 1/00519* (2013.01); *H04N 1/00795* (2013.01)

(58) Field of Classification Search
CPC ... H04N 1/04; H04N 1/00519; H04N 1/00795
See application file for complete search history.

(56) References Cited

U.S. PATENT DOCUMENTS 5,720,021 A * 2/1998 Murata ...................... G06T 1/60
345/581
5,930,411 A * 7/1999 Kojima .................. H04N 1/047
382/312
5,949,921 A * 9/1999 Kojima .................. G06K 9/228
382/275

(Continued)

FOREIGN PATENT DOCUMENTS

CN 102325233 1/2012
TW 201328345 7/2013

(Continued)

*Primary Examiner* — Cheukfan Lee
(74) *Attorney, Agent, or Firm* — Kirton McConkie; Evan R. Witt (57) ABSTRACT

An image capturing method includes steps of providing an image capturing device, obtaining a captured image, a first displacement data and a second displacement data, calculating to obtain an angle deflection data according to the first displacement data and the second displacement data, calculating to obtain a central point real coordinate corresponding to a central point of the image capturing device, calculating to obtain an initial point real coordinate corresponding to an initial point of the captured image and a finish point real coordinate corresponding to a finish point of the captured image, and determining a real coordinate system according to the central point real coordinate, the initial point real coordinate and the finish point real coordinate and correspondingly outputting the captured image with the real coordinate system so as to obtain a corrected terminal image. As a result, the terminal image is similar to the original image.

9 Claims, 7 Drawing Sheets (56) References Cited

U.S. PATENT DOCUMENTS

| | | | |
|---|---|---|---|
| 6,233,066 B1* | 5/2001 | Kojima | H04N 1/0402 358/404 |
| 6,303,921 B1* | 10/2001 | Hastings | H04N 1/047 250/208.1 |
| 6,345,116 B1* | 2/2002 | Kojima | H04N 1/3876 358/518 |
| 7,167,604 B2* | 1/2007 | Allen | H04N 1/00222 358/442 |
| 8,208,181 B2 | 6/2012 | Satoh et al. | |
| 8,600,196 B2* | 12/2013 | King | G06Q 30/00 358/474 |
| 2009/0202180 A1* | 8/2009 | Ericson | G06K 9/228 382/313 |
| 2010/0284048 A1* | 11/2010 | Hou | H04N 1/00827 358/486 |
| 2013/0182002 A1 | 7/2013 | Macciola et al. | |
| 2014/0063565 A1* | 3/2014 | Shan | H04N 1/00244 358/473 |

FOREIGN PATENT DOCUMENTS

| | | |
|---|---|---|
| TW | 201523347 | 6/2015 |
| TW | 201523516 | 6/2015 |
| TW | 201530493 | 8/2015 |

\* cited by examiner

IMAGE CAPTURING METHOD

CROSS-REFERENCE TO RELATED APPLICATION

This application claims priority from Taiwan Patent Application No. TW104135691, filed on Oct. 30, 2015, the entire contents of which are incorporated herein by reference for all purposes.

FIELD OF THE INVENTION

The present invention relates to an image capturing method.

BACKGROUND OF THE INVENTION

In the modern societies, people are increasingly dependent on handheld devices such as smart phones or tablet computers. Consequently, the demands on digitalized documents become stronger. After paper-type documents are digitalized through an imaging capturing process such as a scanning process or photographing process, the documents are converted into digital files. Portable image capturing devices such as portable scanners gradually become the mainstream product in the market because they are portable and available for using at anytime.

Generally, the common portable scanners are classified as two types. The first type of the portable scanners is a portable scanner with a roller structure added on the contact surface of the portable scanner and a paper for helping the user to move the portable scanner stably. The image distortion and image tilt caused by the operation error cannot be avoided while using this type of the portable scanners. Meanwhile, the weight and the volume of the hardware are difficult to be reduced, thereby causing the inconvenience to carry on.

The second type of the portable scanners is a portable scanner with an automatic document feeding mechanism. Although the artificial operation error can be completely avoided, the weight and the volume of the hardware are much greater than the ones of the hardware of the first type of the portable scanners, thereby causing more inconvenience to carry on the portable scanner. Meanwhile, the functions of scanning a book or a large target are lost due to the limitation of the specification of the automatic document feeding mechanism.

Therefore, there is a need of providing an image capturing method utilizing a hardware structure distinct from the prior art in order to enhance the user experiences and solve the above drawbacks.

SUMMARY OF THE INVENTION

Some embodiments of the present invention are to provide an image capturing method in order to overcome at least one of the above-mentioned drawbacks encountered by the prior arts.

The present invention provides an image capturing method. By obtaining the captured image, the first displacement data and the second displacement data and processing a diversified calculation of the captured image, the first displacement data and the second displacement data, the captured image is outputted as a corrected terminal image. Not only the terminal image is similar to the original image, but also the image quality is significantly enhanced. The operation is not limited, so that an image capturing operation can be performed freely, thereby enhancing the user experiences.

The present invention also provides an image capturing method. Since the image correction of the image capturing method is performed by calculating the first displacement data and the second displacement data, only the small and light first optical navigation sensor and second optical navigation sensor have to be installed on the image capturing device. There is no need to utilize the mechanical components to stabilize the image capturing device during capturing an image as prior art. Therefore, the product volume is significantly reduced, and the total weight of the product is effectively reduced.

In accordance with an aspect of the present invention, there is provided an image capturing method. The image capturing method includes steps of providing an image capturing device for executing an image capture operation, obtaining at least a captured image, at least a first displacement data and at least a second displacement data, calculating to obtain an angle deflection data according to the first displacement data and the second displacement data, calculating to obtain a central point real coordinate corresponding to a central point of the image capturing device according to the first displacement data, the second displacement data and the angle deflection data, calculating to obtain an initial point real coordinate corresponding to an initial point of the captured image and a finish point real coordinate corresponding to a finish point of the captured image according to the angle deflection data and the central point real coordinate, and determining a real coordinate system according to the central point real coordinate, the initial point real coordinate and the finish point real coordinate and correspondingly outputting the captured image with the real coordinate system so as to obtain a corrected terminal image.

In accordance with another aspect of the present invention, there is provided an image capturing method. The image capturing method includes steps of providing an image capturing device for executing an image capture operation, obtaining at least a captured image, at least a first displacement data and at least a second displacement data, calculating to obtain an angle deflection data according to the first displacement data and the second displacement data, calculating to obtain a central point real coordinate corresponding to a central point of the image capturing device according to the first displacement data, the second displacement data and the angle deflection data, calculating to obtain an initial point real coordinate corresponding to an initial point of the captured image and a finish point real coordinate corresponding to a finish point of the captured image according to the angle deflection data and the central point real coordinate, determining a real coordinate system according to the central point real coordinate, the initial point real coordinate and the finish point real coordinate and correspondingly outputting the captured image with the real coordinate system so as to obtain a corrected terminal image, judging if the image capture operation is accomplished, and finishing the image capture operation if the result of the judgment is YES. If the result of the judgment is NO, the steps from the step of obtaining at least a captured image, at least a first displacement data and at least a second displacement data are re-performed.

The above contents of the present invention will become more readily apparent to those ordinarily skilled in the art

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
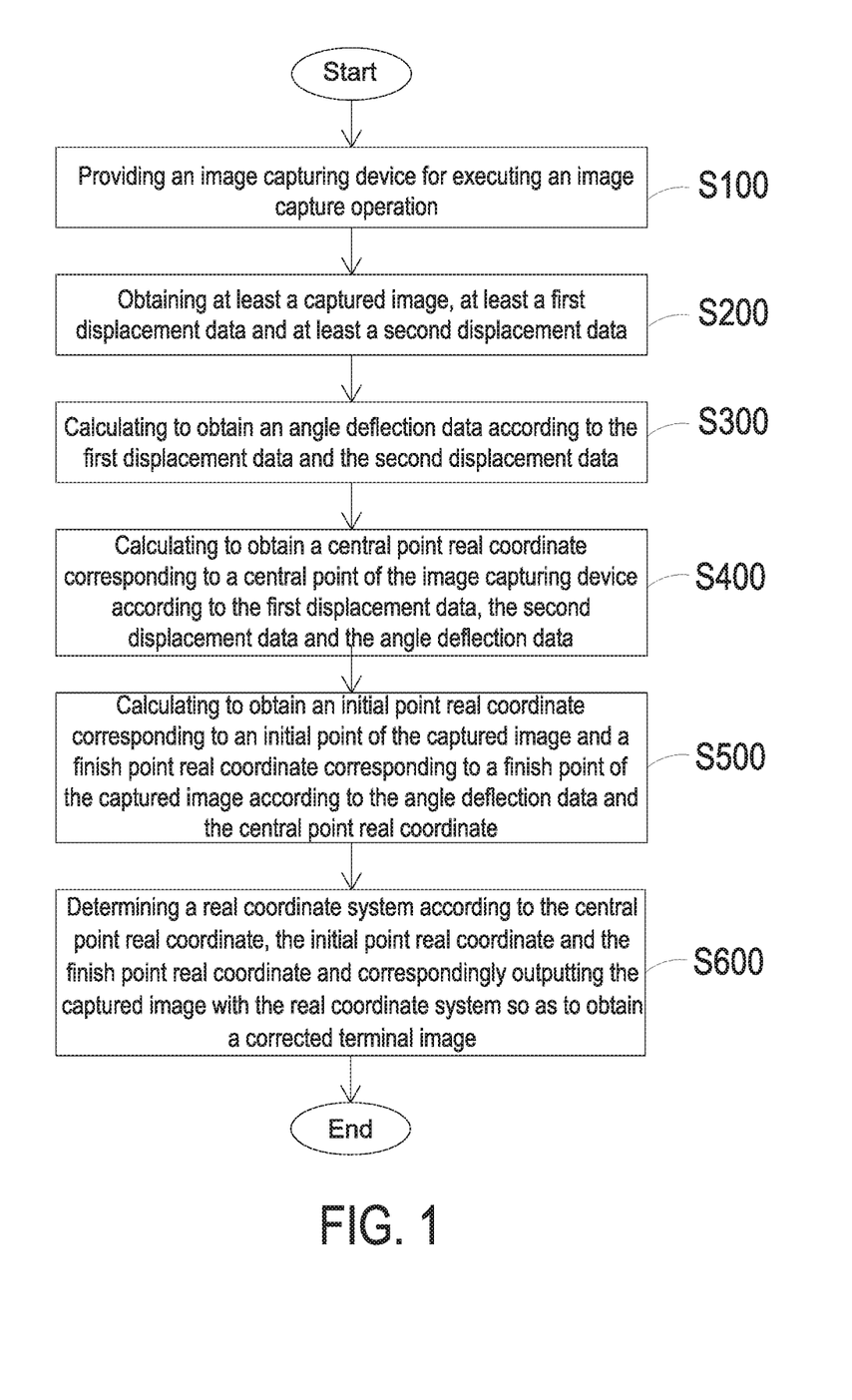
FIG. 1 schematically illustrates the flow chart of an image capturing method according to an embodiment of the present invention.
Figure 2:
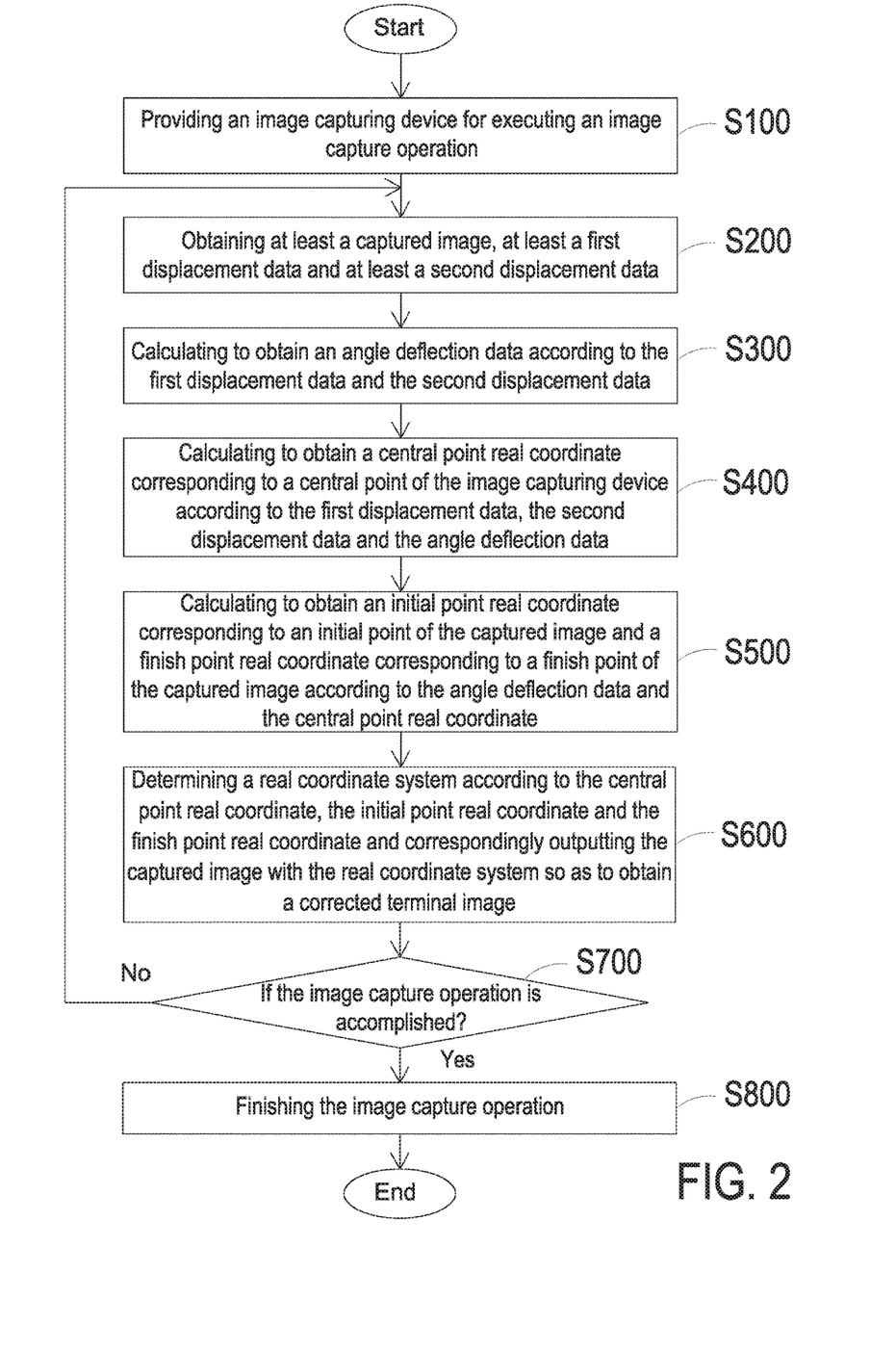
FIG. 2 schematically illustrates the flow chart of an image capturing method according to another embodiment of the present invention.
Figure 3:
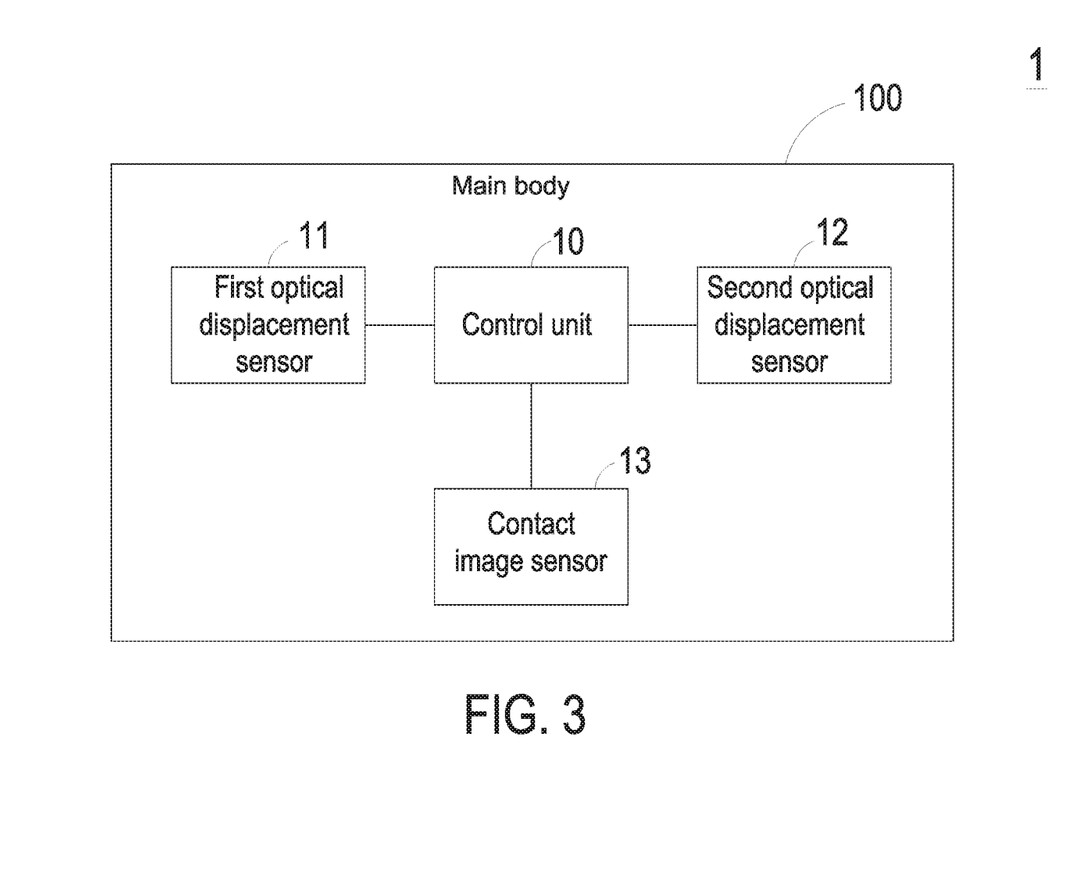
FIG. 3 schematically illustrates the configuration of an image capturing device according to an embodiment of the present invention.
Figure 4:
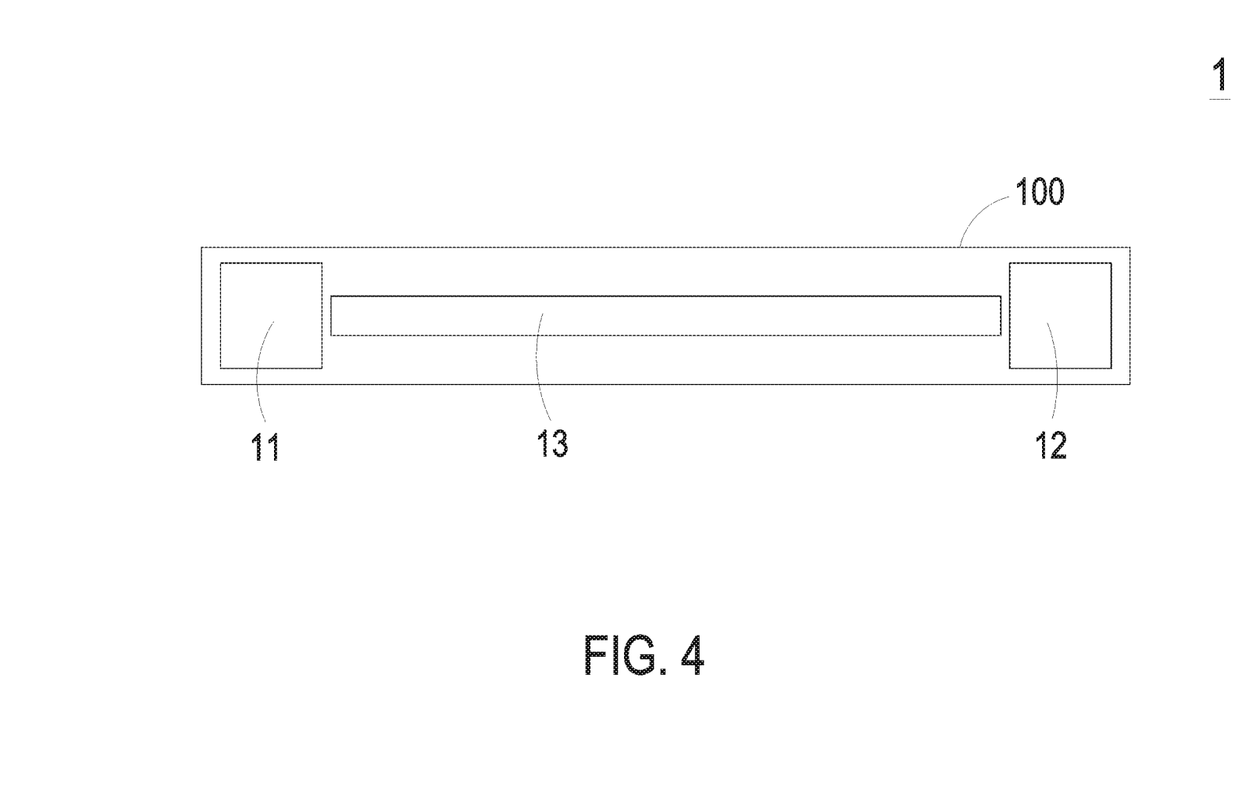
FIG. 4 schematically illustrates the bottom view of an image capturing device according to an embodiment of the present invention.

Please refer to FIGS. 1-4. FIG. 1 schematically illustrates the flow chart of an image capturing method according to an embodiment of the present invention. FIG. 2 schematically illustrates the flow chart of an image capturing method according to another embodiment of the present invention. FIG. 3 schematically illustrates the configuration of an image capturing device according to an embodiment of the present invention. FIG. 4 schematically illustrates the bottom view of an image capturing device according to an embodiment of the present invention. As shown in FIG. 1 to FIG. 4, an image capturing method of the present invention includes at least steps S100 to S600. The entire flow chart of the image capturing method begins at the step S100. As shown in the step S100, providing an image capturing device 1. The image capturing device 1 includes a main body 100, a control unit 10, a first optical navigation sensor (ONS) 11, a second optical navigation sensor 12 and a contact image sensor (CIS) 13. The control unit 10, the first optical navigation sensor 11, the second optical navigation sensor 12 and the contact image sensor 13 are preferably disposed on the main body 100. The control unit 10 is configured to control the operation of the image capturing device 1, and the first optical navigation sensor 11, the second optical navigation sensor 12 and the contact image sensor 13 are connected with the control unit 10.

Next, as shown in the step S200, obtaining at least a captured image, at least a first displacement data and at least a second displacement data. In an embodiment, the captured image is obtained by the contact image sensor 13, the first displacement data is obtained by the first optical navigation sensor 11, and the second displacement data is obtained by the second optical navigation sensor 12, but not limited thereto.

When the contact image sensor 13, the first optical navigation sensor 11 and the second optical navigation sensor 12 are simultaneously utilized for respectively obtaining the captured image, the first replacement data and the second displacement data, the shortest time of capturing each row must be lengthened if the contact image sensor 13 is linked with the first optical navigation sensor 11 and the second navigation sensor 12. For the user, the fastest tolerance speed is decreased, thereby affecting the ease of use. Therefore, in some preferred embodiments, the contact image sensor 13 is not linked with the first optical navigation sensor 11 and the second navigation sensor 12, thereby enhancing the user experiences. Particularly, in the step S200, each of the captured image is obtained by the contact image sensor 13 of the image capturing device 1 whenever the contact image sensor 13 of the image capture device 1 is moved through a distance, and each of the first displacement data and each of the second displacement data are periodically obtained by the first optical navigation sensor 11 and the second navigation sensor 12 of the image capturing device 1 at a time interval. Under this circumstance, the contact image sensor 13 can be operated at full speed, and the information of each row of the captured image captured by the contact image sensor 13 can be obtained through an interpolation calculation of the first displacement data obtained by the first optical navigation sensor 11 and the second displacement data obtained by the second optical navigation sensor 12.

Figure 5:
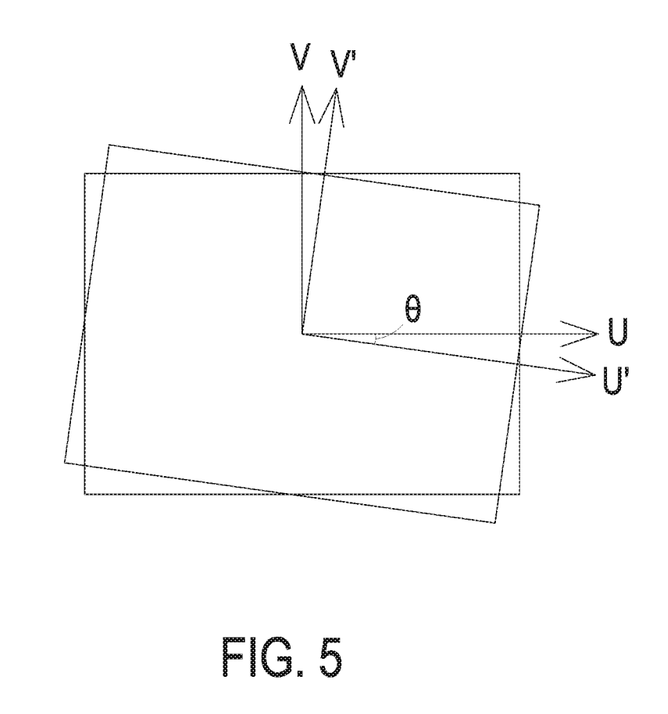
FIG. 5 schematically illustrates the original displacement data and the displacement data with angle deflection.

Next, as shown in the step S300, calculating to obtain an angle deflection data according to the first displacement data and the second displacement data. Please refer to FIG. 1 and FIG. 5. FIG. 5 schematically illustrates the original displacement data and the displacement data with angle deflection. In general, the first displacement data and the second displacement data obtained through the image capturing method of the present invention include two perpendicular vectors U, V. If the difference between the present sensing result and the last sensing result of the first optical navigation sensor 11 and the second optical navigation sensor 12 is a deflection angle θ, the difference between the two vectors U', V' included in the first displacement data and the second displacement data, which are angle-deflected, and the two vectors U, V included in the first displacement data and the second displacement data, which are original, is also the deflection angle θ. To correct the deflection, the calculation of the deflection angle θ is necessary.

Figure 6:
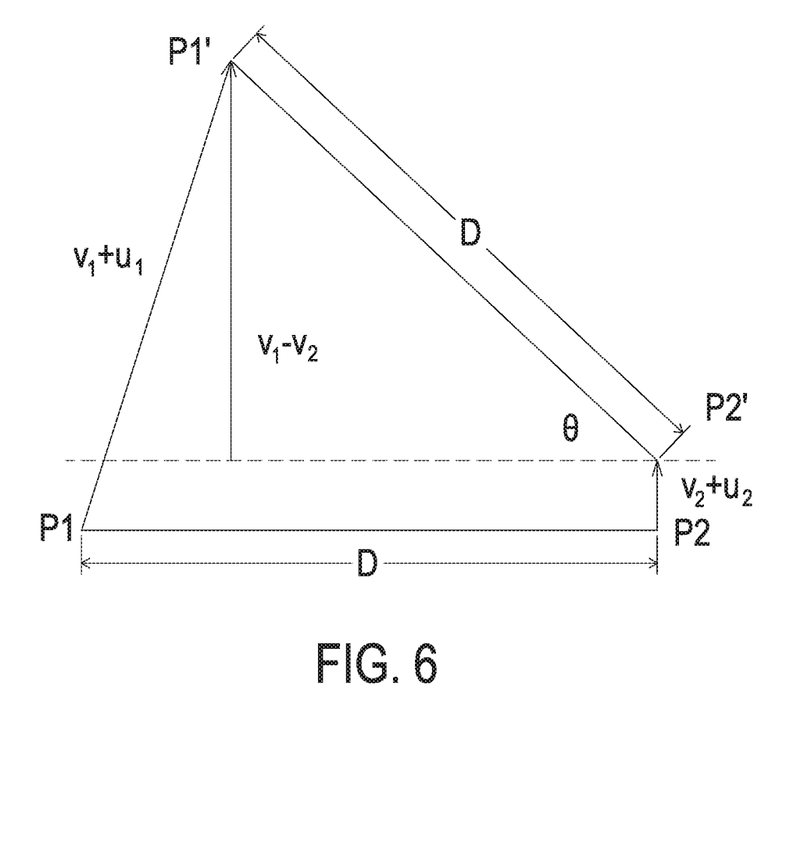
FIG. 6 schematically illustrates the relative positions and the deflection angle of the image capturing device obtained according to the first displacement data and the second displacement data before and after the move of the image capturing device.

For calculating the deflection angle θ and further obtaining the angle difference, the vector relation and the distance D between the first optical navigation sensor 11 and the second optical navigation sensor 12 are used to calculate. Please refer to FIG. 6. FIG. 6 schematically illustrates the relative positions and the deflection angle of the image capturing device obtained according to the first displacement data and the second displacement data before and after the move of the image capturing device. As shown in FIG. 6, the position P1 and the position P2 respectively indicate the position of the first optical navigation sensor 11 and the position of the second optical navigation sensor 12 before move, and the position P1' and the position P2' respectively indicate the position of the first optical navigation sensor 11 and the position of the second optical navigation sensor 12 after move. Distance D indicates the distance between the first optical navigation sensor 11 and the second optical navigation sensor 12. Therefore, the deflection angle θ can be obtained through the calculation of arcsine function: $\theta=\sin^{-1}((v_1-v_2)/D)$. Moreover, the angle difference $\theta_i$ between the $i^{th}$ displacement data and the $1^{st}$ displacement data can be calculated by $\theta_i = \Sigma_{k=1}^{i} d\theta_k$.

Then, as shown in the step S400, calculating to obtain a central point real coordinate corresponding to a central point of the image capturing device 1 according to the first displacement data, the second displacement data and the angle deflection data. In some embodiments, a central position of the contact image sensor 13 is overlapped with the central point of the image capturing device 1. In other words, the central point real coordinate obtained in the step S400 is not only corresponded to the central point of the image capturing device 1, but also corresponded to the central position of the contact image sensor 13. In this step S400, if the present position of the first optical navigation sensor 11 is P1 and the present position of the second optical navigation sensor 12 is P2, the position Pc of the central point is calculated by Pc=(P1+P2)/2. If the first displacement data obtained after the displacement by the first optical navigation sensor 11 is V1 and the second displacement data obtained after the displacement by the second optical navigation sensor 12 is V2, the position P1' of the first optical navigation sensor 11 after the displacement is calculated by P1'=P1+V1, the position P2' of the second optical navigation sensor 12 after the displacement is calculated by P2'=P2+V2, and the position Pc' of the central point after the displacement is calculated by Pc'=(P1'+P2')/2.

Next, as shown in the step S500, calculating to obtain an initial point real coordinate corresponding to an initial point of the captured image and a finish point real coordinate corresponding to a finish point of the captured image according to the angle deflection data and the central point real coordinate. In this step S500, the initial point real coordinate and the finish point real coordinate are obtained through a calculation of an algorithm of linear interpolation and matrix transformation, but not limited thereto. In the previous steps S300 and S400, the central point $Pc_i$ and the angle difference $\theta_i$ during obtaining data at the $i^{th}$ time are calculated. If t(i) represents the time of the $i^{th}$ load of the first optical navigation sensor 11 and the second optical navigation sensor 12 and t(j) represents the time that the contact image sensor 13 loads the $j^{th}$ row, the equations of linear interpolation for obtaining the central point $Ic_j$ of the $j^{th}$ row image and the angle difference $I\theta_j$ are given by:

$$Ic_j = Pc_i + \frac{t(j)-t(i)}{(t(i+1)-t(i))}(Pc_{i+1} - Pc_i), t(i) \le t(j) < t(i+1)$$

$$I\theta_j = \theta_i + \frac{t(j)-t(i)}{(t(i+1)-t(i))}(\theta_{i+1} - \theta_i), t(i) \le t(j) < t(i+1)$$

Furthermore, the equations of matrix transformation for obtaining the initial point coordinate $Ia_j$ and the finish point $Ib_j$ are given by:

$$Ia_j = Ic_j + \frac{L}{2}\begin{bmatrix} -\cos I\theta_j \\ \sin I\theta_j \end{bmatrix}$$

$$Ib_j = Ic_j + \frac{L}{2}\begin{bmatrix} \cos I\theta_j \\ -\sin I\theta_j \end{bmatrix}$$

L represents the length of the contact image sensor 13, $$Ia_j = \begin{bmatrix} Xa_j \\ Ya_j \end{bmatrix}, Ib_j = \begin{bmatrix} Xb_j \\ Yb_j \end{bmatrix}, Ic_j = \begin{bmatrix} Xc_j \\ Yc_j \end{bmatrix}.$$

Figure 7:
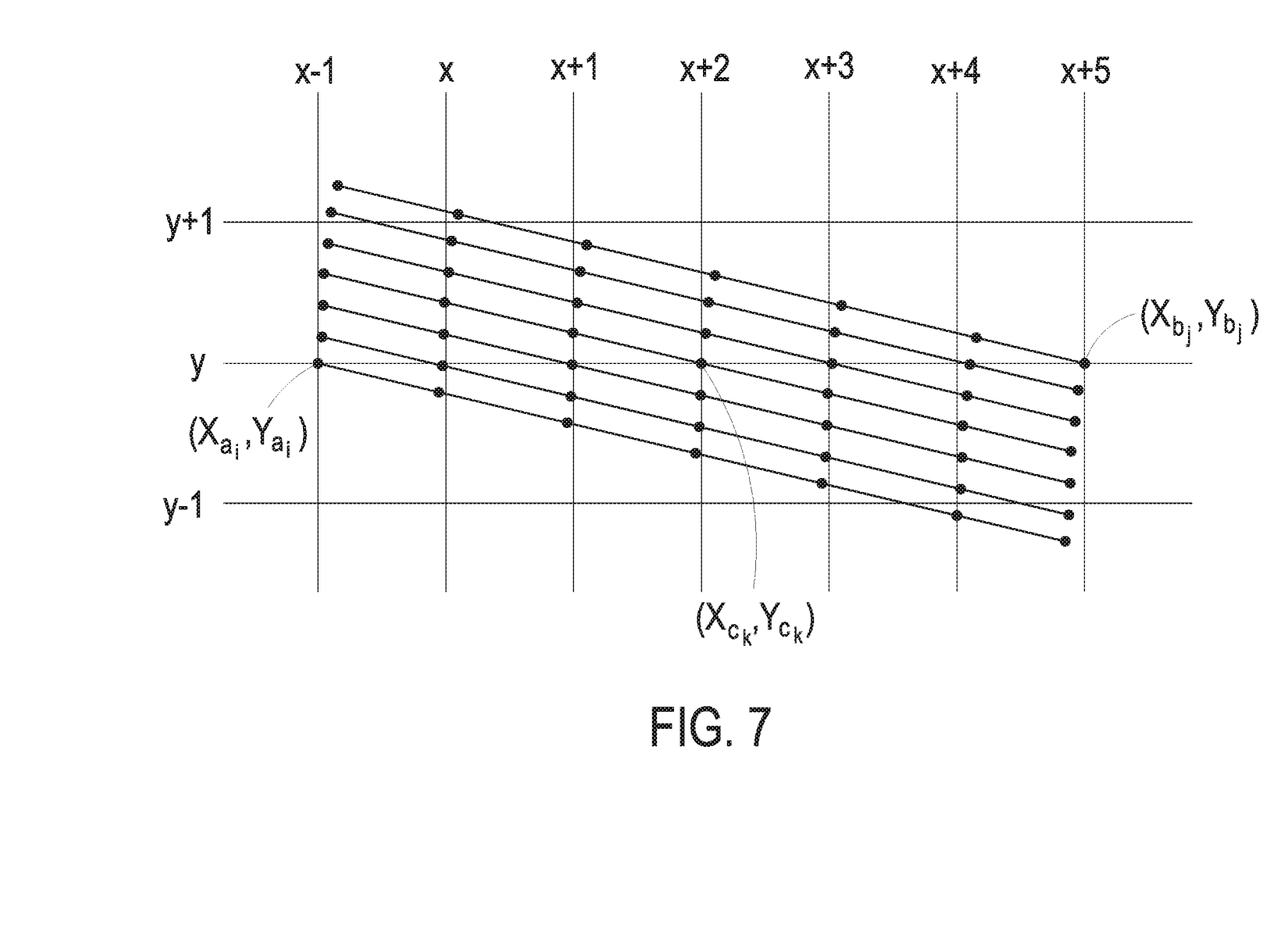
FIG. 7 schematically illustrates the original coordinate system and the real coordinate system determined by the image capturing method of the present invention.

Then, as shown in the step S600, determining a real coordinate system according to the central point real coordinate, the initial point real coordinate and the finish point real coordinate and correspondingly outputting the captured image with the real coordinate system so as to obtain a corrected terminal image. In this step S600, the real coordinate system is determined according to the central point real coordinate, the initial point real coordinate and the finish point real coordinate through an algorithm of triangular ratios and proportions. Please refer to FIGS. 1-7. FIG. 7 schematically illustrates the original coordinate system and the real coordinate system determined by the image capturing method of the present invention. As shown in FIG. 1 to FIG. 7, to find the point (x, y) in the real coordinate system, the point (x', y') in the original image (i.e. the original coordinate system) should be considered. The calculation includes steps as follows. At first, find three values i, j, k such that $Ya_i=Yb_j=Yc_k=y$, in which the values i, j are the range of y'. Next, use the proportions of x to obtain y', in which:

$$y' = \begin{cases} k-(k-i)(Xc_k-x)/(Xc_k-Xa_i), x \le Xc_j \\ k-(k-j)(Xc_k-x)/(Xc_k-Xb_i), x > Xc_j \end{cases}$$

After y' is obtained, the next step is to obtain x', in which:

$$x' = \begin{cases} \dfrac{x - Xa_{y'}}{Xc_{y'} - Xa_{y'}} L/2, x < 0 \\ \left(\dfrac{Xb_{y'} - x}{Xb_{y'} - Xc_{y'}} + 1\right) L/2, x \ge 0 \end{cases}$$

However, if each point is calculated by x' in this manner, it will consume a large amount of resources. Therefore, x' is optimized as $x'=x-Xa_{y'}$ when $\theta_{y'}$ is not large, thereby speeding up the computing process. Using the calculation and steps mentioned above, the captured image can be outputted with the real coordinate system so as to obtain the terminal image, which is corrected.

In some embodiments, the step S300, the step S400, the step S500 and the step S600 are implemented by the control unit 10 of the image capturing device 1, but not limited thereto.

In some varied embodiments, after the step S600, the image capturing method of the present invention further includes a step S700 of judging if the image capture operation is accomplished. If the result of the judgment is YES, a step S800 of finishing the image capture operation is performed after the step S700, and if the result of the judgment is NO, the step S200 to the step S700 are performed after the step S700. In brief, if the judgment shows that the image capture operation is not accomplished, the step S200 to the step S600 are re-performed after the step S700 for image capturing and correcting, and the step S700 is also re-performed for judging if the image capture operation is accomplished. If the judgment shows that the image capture operation is accomplished, the step S800 of finishing the image capture operation is performed after the step S700. The entire flow chart of the image capturing method finishes at the step S800.

From the above description, the present invention provides an image capturing method. By obtaining the captured image, the first displacement data and the second displacement data and processing a diversified calculation of the captured image, the first displacement data and the second displacement data, the captured image is outputted as a corrected terminal image. Not only the terminal image is similar to the original image, but also the image quality is significantly enhanced. The operation is not limited, so that an image capturing operation can be performed freely, thereby enhancing the user experiences.

Meanwhile, since the image correction of the image capturing method is performed by calculating the first displacement data and the second displacement data, only the small and light first optical navigation sensor and second optical navigation sensor have to be installed on the image capturing device. There is no need to utilize the mechanical components to stabilize the image capturing device during capturing an image as prior art. Therefore, the product volume is significantly reduced, and the total weight of the product is effectively reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image capturing method, comprising steps of:
   (a) providing an image capturing device for executing an image capture operation;
   (b) obtaining at least a captured image, at least a first displacement data and at least a second displacement data, wherein each of the captured image is obtained by the image capturing device whenever the image capture device is moved through a distance, and each of the first displacement data and each of the second displacement data are periodically obtained by the image capturing device at a time interval;
   (c) calculating to obtain an angle deflection data according to the first displacement data and the second displacement data;
   (d) calculating to obtain a central point real coordinate corresponding to a central point of the image capturing device according to the first displacement data, the second displacement data and the angle deflection data;
   (e) calculating to obtain an initial point real coordinate corresponding to an initial point of the captured image and a finish point real coordinate corresponding to a finish point of the captured image according to the angle deflection data and the central point real coordinate; and
   (f) determining a real coordinate system according to the central point real coordinate, the initial point real coordinate and the finish point real coordinate and correspondingly outputting the captured image with the real coordinate system so as to obtain a corrected terminal image.

2. The image capturing method according to claim 1 further comprising a step, after the step (f), of (g) judging if the image capture operation is accomplished, wherein if the result of the judgment is YES, a step of (h) finishing the image capture operation is performed after the step (g), and if the result of the judgment is NO, the step (b) to the step (g) are performed after the step (g).

3. The image capturing method according to claim 1, wherein the image capturing device comprises:
   a control unit;
   a first optical navigation sensor connected with the control unit for obtaining the first displacement data;
   a second optical navigation sensor connected with the control unit for obtaining the second displacement data; and
   a contact image sensor connected with the control unit for obtaining the captured image.

4. The image capturing method according to claim 3, wherein the step (c), the step (d), the step (e) and the step (f) are implemented by the control unit.

5. The image capturing method according to claim 3, wherein a central position of the contact image sensor is overlapped with the central point of the image capturing device.

6. The image capturing method according to claim 1, wherein the step (c) comprises a sub-step of (c1) calculating to obtain a deflection angle and an angle difference of the angle deflection data through the arcsine function.

7. The image capturing method according to claim 1, wherein in the step (e), the initial point real coordinate and the finish point real coordinate are obtained through a calculation of an algorithm of linear interpolation and matrix transformation.

8. The image capturing method according to claim 1, wherein in the step (f), the real coordinate system is determined according to the central point real coordinate, the initial point real coordinate and the finish point real coordinate through an algorithm of triangular ratios and proportions.

9. An image capturing method, comprising steps of:
   (a) providing an image capturing device for executing an image capture operation;
   (b) obtaining at least a captured image, at least a first displacement data and at least a second displacement data;
   (c) calculating to obtain an angle deflection data according to the first displacement data and the second displacement data;
   (d) calculating to obtain a central point real coordinate corresponding to a central point of the image capturing device according to the first displacement data, the second displacement data and the angle deflection data;
   (e) calculating to obtain an initial point real coordinate corresponding to an initial point of the captured image and a finish point real coordinate corresponding to a finish point of the captured image according to the angle deflection data and the central point real coordinate;
   (f) determining a real coordinate system according to the central point real coordinate, the initial point real coordinate and the finish point real coordinate and correspondingly outputting the captured image with the real coordinate system so as to obtain a corrected terminal image;
   (g) judging if the image capture operation is accomplished; and
   (h) finishing the image capture operation,
   wherein if the result of the judgment of the step (g) is YES, the step (h) is performed after the step (g), and if the result of the judgment of the step (g) is NO, the step (b) to the step (g) are re-performed after the step (g).

\* \* \* \* \*